UNITED STATES PATENT OFFICE.

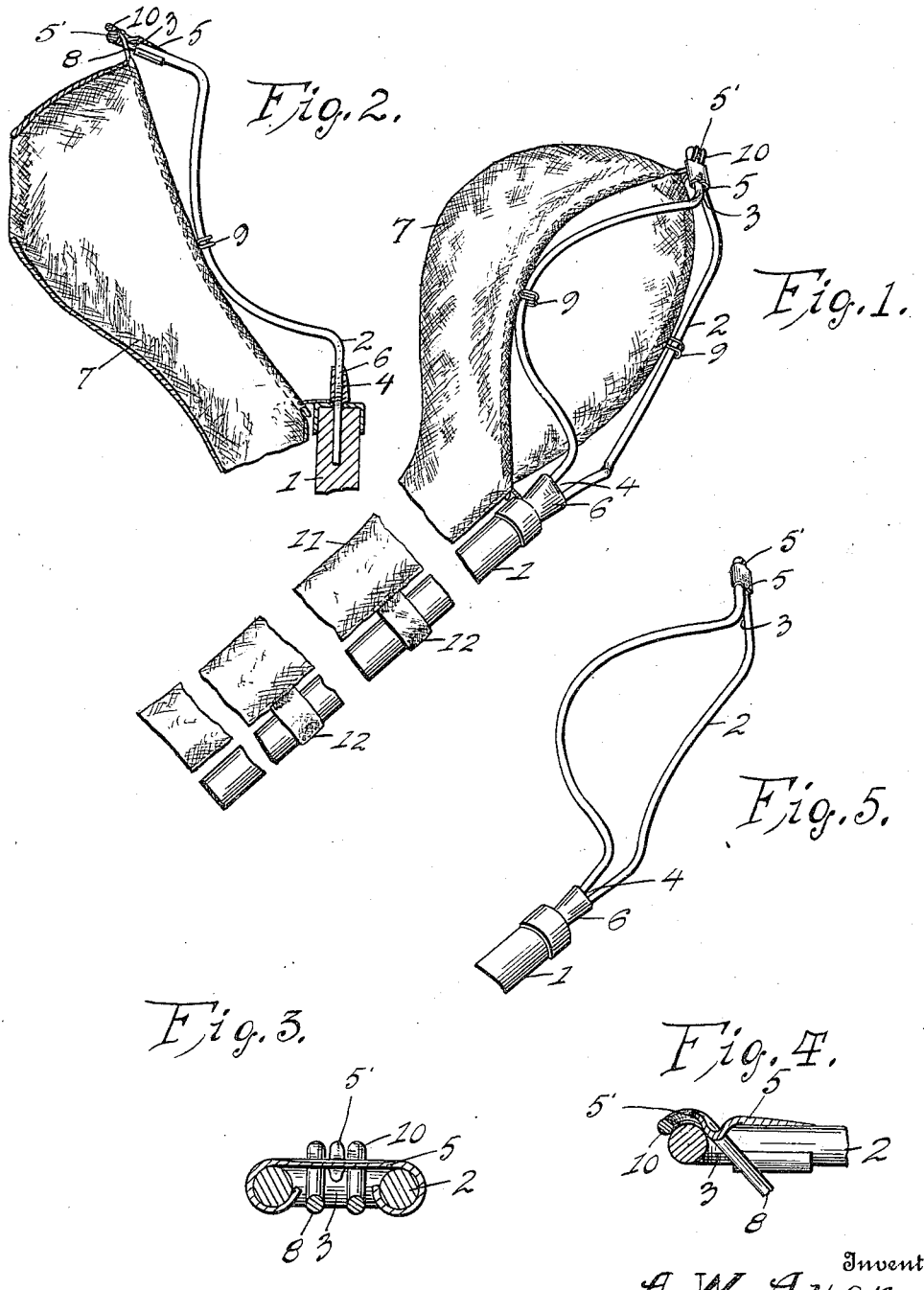

ALBERTUS W. AYER, OF LAWRENCE, KANSAS.

FRUIT-PICKER.

1,064,881.

Specification of Letters Patent. Patented June 17, 1913.

Application filed November 23, 1912. Serial No. 733,161.

*To all whom it may concern:*

Be it known that I, ALBERTUS W. AYER, a citizen of the United States, residing at Lawrence, in the county of Douglas and State of Kansas, have invented certain new and useful Improvements in Fruit-Pickers, of which the following is a specification, reference being had to the accompanying drawings.

This invention relates to new and useful improvements in fruit pickers and has for its object to provide a device of this character which will enable the operator to readily remove fruit from trees of various heights and allow the removed fruit to be conveyed to a receptacle carried by the operator.

A further object of the invention resides in providing a device having a frame or the like formed thereon of a single strand of material, the sides thereof converging at their ends to form fruit gripping spaces thereon and a still further object resides in providing knife blades to be carried by the frame at the detaching spaces thereof.

Still another object of the invention resides in providing a substantial sack and conveyer which is adapted to be removably engaged with the aforesaid frame, and a still further object resides in providing a yielding frame for the sack portion to be readily applied to the first mentioned frame.

A further object of the invention resides in providing hooks on the sack for engagement with the detaching frame, one of said hooks being so engaged with the latter frame as to aid in the retaining of one of the knife blades in position thereon.

A still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view showing my device being applied to use. Fig. 2 is a vertical longitudinal section through the device. Fig. 3 is a vertical transverse section taken through the knife blade. Fig. 4 is an enlarged vertical longitudinal section through the frame showing the engagement of the one hook member on the sack frame and the spring tongue of the knife blade therewith; and Fig. 5 is a perspective view of the device with the usual catching and conveying mechanism removed.

In describing my invention, I shall refer to the drawing in which similar reference characters designate corresponding parts throughout the several views and in which—

1 indicates an elongated handle, to the upper end of which is secured my improved detaching frame composed of a single strand of wire 2, the ends of which, after forming of the frame are secured in the one end of the handle. This frame, in plan, has the sides thereof bulged or convexed and the ends of the wire forming the sides of this frame converge to form the fruit gripping spaces 3 and 4. The frame being formed of a single strand of wire, the loop therein, between the two sides of the same is formed at the outer end of the device or at the detaching space 3, and while the sides of this frame are disposed to a plane below the plane of the detaching spaces, the complete frame may be said to be disposed at an obtuse angle with respect to the handle 1.

As stated, the portions of the wire forming the sides of the device converge at the ends thereof to provide the detaching spaces 3 and 4 and engaged with the portions of the wire forming these spaces are the knife blades 5 and 6. These knife blades have the side edges thereof bent around the wire portions forming the sides of the spaces 3 and 4, but as the space 3 converges toward its outer end, it will be seen that the knife blade 5 may be readily removed from the frame at this point. In order to retain this knife blade 5 on the frame, a bent spring tongue 5′ is formed on the outer edge thereof and disposed in engagement with the loop at the outer end of the detaching space 3. This spring tongue retains the knife blade in its proper position upon the frame, but affords a ready means for removal, as all that is necessary when it is desired to detach the blade, is to grasp the same by the fingers raising it upwardly and removing the blade.

From the foregoing description, it will be seen that a pruning device has been formed which is readily adapted for use to remove excess fruit from trees, when desired. It will be appreciated that in accomplishing this result, it is only necessary to raise the device to the pieces of fruit desired to be removed and allow the stems thereof to be engaged in one of the detaching spaces 3 and 4. If the stem is engaged in the space 3, a pull may be given the handle 1 and the stem will be severed from the branch of the tree and if the stem be disposed in the space 4, an upward push may be given the handle 1 and the stem will be severed. I have provided a catching and conveying means, however, to be used in connection with this device when it is desired to collect the fruit removed from the trees. To this end, I provide a substantial sack 7 which has a yielding wire frame 8 around the upper edges thereof and engaged with this frame are the hooks 9 which are adapted to be engaged with the sides of the aforesaid detaching frame carried on the end of the handle 1. An additional hook 10 is provided, at the outer end of the frame 8 which is adapted to be received in the space 3 of the detaching frame to rest in engagement with the loop of the wire forming the same, just beyond the knife blade 5, as clearly shown in the figures, of the drawings. In view of this arrangement, the spring tongue 5' of the knife blade 5 will rest on the loop of the wire frame 2 between the arms of the hook 10, as clearly shown in Figs. 3 and 4 of the drawing and this spring tongue will obviously aid to retain said hook 10 in engagement with the frame throughout the operation of the device. The sack 7 also has formed thereon, the conveying chute or the like 11 which is adapted to be held by means of the rings or the like 12, to the handle member 1. Thus, from this construction, it will be seen that as the fruit is removed from the branches of the trees, the same will be dropped into the sack and be conveyed through the chute 11 to any desired receptacle carried by the operator.

From the foregoing description of the construction of my improved device, the operation thereof will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

In a fruit picker, the combination with a handle member, a frame carried thereby, said frame formed from a single strand of wire, a fruit container carried by the frame, the opposite ends of the frame being converged, of a clip connecting the converged strand sections at one end of the frame, the edges of said clip embracing said converging strand sections, a knife blade formed at one end of the clip, and a spring locking tongue formed upon the opposite end of the clip and engaging the frame.

In testimony whereof I hereunto affix my signature in the presence of two witnesses.

ALBERTUS W. AYER.

Witnesses:
O. H. AYER,
ANNA LOTHROP.

Copies of this patent may be obtained for five cents each, by addressing the "Commissioner of Patents. Washington, D. C."